US005157333A

United States Patent [19]

Peacock et al.

[11] Patent Number: 5,157,333

[45] Date of Patent: Oct. 20, 1992

[54] DISCHARGE INITIATING MEANS FOR COLD CATHODE DISCHARGE IONIZATION GAUGE

[75] Inventors: Roy N. Peacock; Neil T. Peacock, both of Lafayette, Colo.

[73] Assignee: MKS Instruments, Inc., Andover, Mass.

[21] Appl. No.: 668,053

[22] Filed: Mar. 12, 1991

[51] Int. Cl.[5] ....................... G01L 21/34; G01L 21/30; G01N 27/62

[52] U.S. Cl. .................................... 324/463; 324/460; 324/464; 315/150

[58] Field of Search ................ 324/459, 460, 462, 463, 324/464, 465; 315/150

[56] References Cited

U.S. PATENT DOCUMENTS

| | | | |
|---|---|---|---|
| 1,596,758 | 8/1926 | Mutscheller | 315/150 |
| 2,066,799 | 0/1961 | Ball . | |
| 2,986,037 | 0/1961 | Robinson . | |
| 3,280,365 | 10/1966 | Young | 324/463 |
| 3,438,259 | 0/1969 | Bossert, Jr. . | |
| 3,891,882 | 0/1975 | Barraco . | |
| 4,413,185 | 0/1983 | Leveson et al. . | |
| 4,471,661 | 0/1984 | Edwards, Jr. . | |
| 4,652,752 | 0/1987 | Ino et al. . | |
| 4,833,921 | 0/1989 | Longo et al. . | |
| 4,970,434 | 11/1990 | Christophorou et al. | 315/150 |

FOREIGN PATENT DOCUMENTS 1535314 of 1978 United Kingdom .

OTHER PUBLICATIONS

H. Mennenga and W. Schaedler, Proc. Fourth International Vac. Congress 1968 (Adlard and Sons, Surrey) p. 656.

Paul Redhead, Can. J. Physics, 37, 1260 (1959).

A. Berman, *Total Pressure Measurements in Vacuum Technology* (Academic Press, N.Y., 1985), pp. 217–222.

Chikara Hayashi, *J. Vac. Sci. Technol* 3, 286, (1966).

*Primary Examiner*—Kenneth A. Wieder

*Assistant Examiner*—Diep Do

*Attorney, Agent, or Firm*—Sixbey, Friedman, Leedom & Ferguson

[57] ABSTRACT

A cold cathode gauge including a glow lamp or the like disposed within the vacuum space of the gauge for initiating the gauge discharge, the lamp emitting UV or blue light directly at least at the cathode of the gauge where the energy of the light is sufficient to release photoelectrons from the cathode to thus initiate the discharge. Various techniques for supplying power to the lamp are also disclosed.

36 Claims, 2 Drawing Sheets

DISCHARGE INITIATING MEANS FOR COLD CATHODE DISCHARGE IONIZATION GAUGE

BACKGROUND OF THE INVENTION

1. Field of the Invention

This invention relates to cold cathode ionization gauges and, in particular, to means for initiating the discharge in such gauges.

2. Discussion of the Prior Art

One of the gauges frequently used for measuring gas pressures in the high vacuum regime down to $10^{-10}$ Torr, and occasionally even to $10^{-14}$ Torr, is the cold cathode ionization gauge (CCG). A cold cathode discharge gauge utilizes a self sustaining discharge between an anode and cathode. A magnetic field suitably arranged forces the electrons into very long paths. There are several types of CCG with differing geometries: the Penning, the magnetron, and the invention magnetron. These are discussed by A. Berman in his book, "Total Pressure Measurements in Vacuum Technology".

Starting the discharge in a CCG requires an initial chance ionizing event, such as ionization by cosmic rays or a field emitted electron. The delay between turning on the high voltage to a CCG and the beginning of the build up of current in the discharge (starting time) is dependent upon the pressure. For a typical gauge it may require seconds at $10^{-5}$ Torr, and several hours at $10^{-10}$ Torr. Thus, the starting delay at low pressures may be unacceptably long.

The problem of delayed starting in a CCG is well recognized, and is discussed by Berman on page 219 of the above-mentioned "Total Pressure Measurements in Vacuum Technology".

Berman discusses several techniques for initiating the discharge in a CCG. These are:

(1) providing a pulse of electrons from a hot filament;

(2) incorporating a sharp point or edge on the cathode or anode to provide field emission electrons, or field ionization of residual gas; and (3) including a radioactive source to provide initial ionizing means.

In addition there is another method, not mentioned by Berman, which, to the best of applicants' knowledge, has never been used in a commercial gauge:

(4) using an external source of short wavelength light to provide electrons by photoemission.

Method (1) is effected by including within the gauge a thermionic electron source to trigger the discharge. Triggering the discharge requires the operator to decide that conditions are such that a discharge should exist, but does not. Then it is necessary to briefly push a trigger button on the control panel to start the discharge. An annoying pressure burst accompanies heating of the trigger filament, and if the button is actuated at high pressures, the filament can be damaged.

Method (2) is characterized by the use of a sharp point or edge on one of the electrodes and is a technique presently used by Balzers ag. The problem with this method is that the sharp point or edge is dulled by the action of the discharge, or its emission characteristics are altered by the presence of films formed in the discharge. Although it can work for a time, it is not dependable over long gauge operating times.

Method (3), the use of a radioactive source, requires fairly large radioactive sources to provide adequate ionization for starting at low pressures. This method is disclosed in J. Vac. Sci. Technol 3, 286, (1966) by C. Hayashi; H. Mennenga and W. Schaedler in *Proc. Fourth International Vac. Congress* 1968, p. 656; and British Pat. No. 1535314 of B. D. Power and C. R. D. Priestland. With the present attitude toward the hazards of radioactive materials, this method is impractical today. The problem is particularly serious in CCG's because the source must be closely positioned to the discharge cell electrodes where the radioactive material is subject to dispersal. Alpha and beta rays have very little penetrating ability, and thus must be used as superficial sources. The discharge causes sputtering of the electrodes, so that the radioactive source material can be spread about the vacuum system. Another concern is that workers assembling such gauges would be exposed to the radiation.

With respect to method (4), Paul Redhead reported in Can. J. Physics, 37, 1260 (1959) that the discharge in a CCG can be started by an external UV light, see page 1266. The gauge had a glass envelope which allowed some light from the external UV source to enter the gauge, although glass is not very transparent to UV light. The energetic UV light freed photo electrons from the gauge cathode, aiding in starting the discharge.

The disadvantage of this method as practiced by Redhead is the requirement that the envelope be transparent—all commercial gauges today are made of metal—and the need for a sizable, expensive UV source.

SUMMARY OF THE INVENTION

In view of the foregoing problems associated with the prior art, it is a primary object of the present invention to provide a miniature, vacuum compatible source of electromagnetic radiation which can be incorporated within the vacuum envelop of a CCG to effect initiation of the discharge thereof.

It is a further primary object of the present invention to provide a simple means of starting the discharge in a cold cathode ionization gauge and thus enabling it to provide useful pressure information within a short time after turn on.

The invention comprises the addition to a conventional CCG of a weak source of blue or ultraviolet light, for example, within the vacuum enclosure of the gauge. The source must be positioned so that emitted light will strike at least the cathode of the gauge. In this regard, a miniature glow lamp filled with a mixture of inert gases such as neon, argon and xenon is a suitable light source.

When no special means for initiating the discharge are used, the starting time for a CCG is pressure dependent, typically ranging from seconds at a pressure of $10^{-5}$ Torr, to hours at $10^{-10}$ Torr. Using an internal light source in accordance with the present invention, the discharge starts immediately even at low pressures, and the discharge current reaches its equilibrium value within about 10 to 15 seconds in the mid-pressure range of the gauge.

Other objects and advantages of the invention will be apparent from a reading of the following specification and claims taken with the drawing.

DETAILED DESCRIPTION OF PREFERRED EMBODIMENTS OF THE INVENTION

Figure 1:
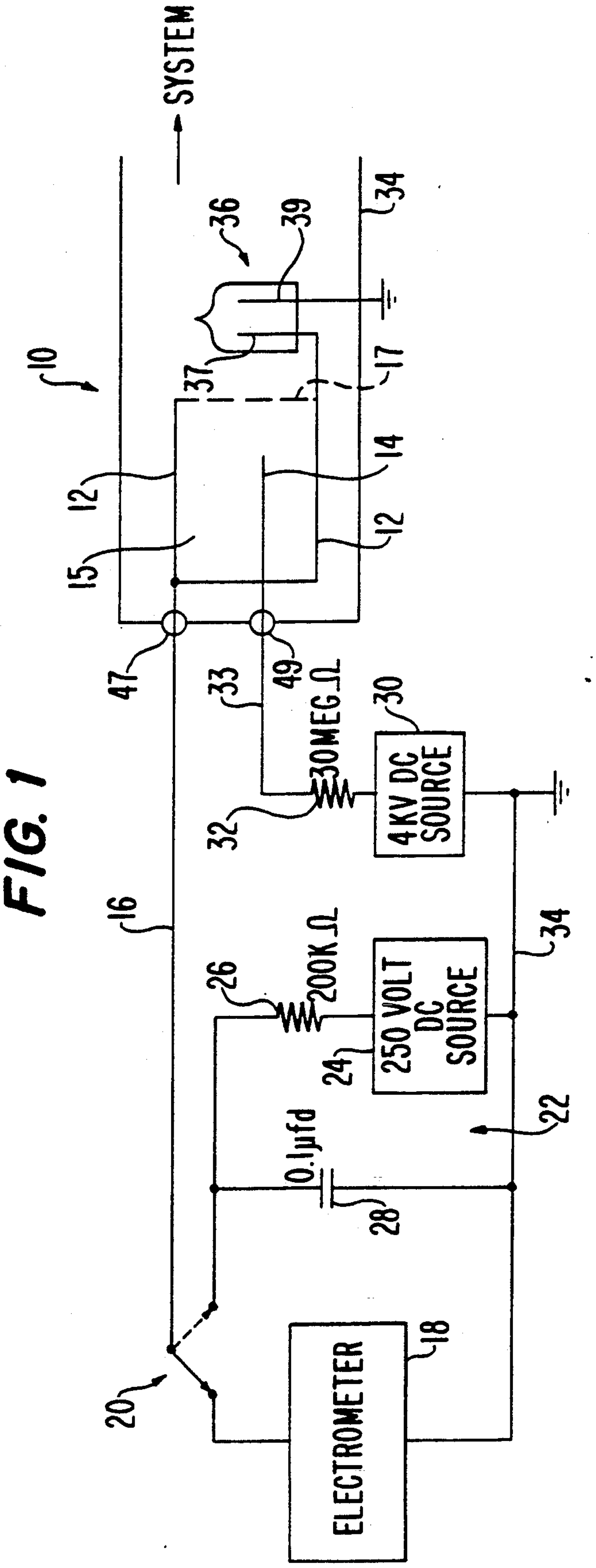
FIG. 1 is a schematic diagram of an illustrative embodiment of the invention wherein an electromagnetic radiation source is connected to a voltage source using one of the existing feedthroughs of a cold cathode gauge.

Reference is made to the drawing where like parts refer to like reference numerals.

Referring to FIG. 1, an inverted magnetron type of cold cathode gauge 10 is illustrated which includes a cathode 12 and an anode 14, the gauge being conventionally connected with a system whose pressure is to be measured. As is well known, the system is directly connected to the vacuum space 15 within the gauge where openings 17 may be provided in the cathode to facilitate such communication. The cathode is connected to a conventional electrometer circuit 18 via a cathode lead 16 and a switch 20 where the electrometer measures the gauge discharge current to thus provide an indication of the system pressure. When the switch is in its dotted line position, the cathode is connected to a pulse voltage source generally indicated at 22 which includes a DC voltage source 24, a resistor 26 and a capacitor 28.

The anode is connected to a DC voltage supply 30 through a resistor 32 and feedthrough 49. Feedthrough 47 enables connection of cathode lead 16 to cathode 12.

Illustrative values are given for the resistors 26 and 32, capacitor 28 and voltage sources 24 and 30, it being understood these values are simply illustrative, there being no intent to restrict the invention to these particular values. Ground is conventionally indicated at 34.

In accordance with the invention, an electromagnetic radiation source 36 is disposed within the vacuum space of gauge 10. In a preferred embodiment of the invention, radiation source 36 comprises a miniature glow lamp filled with a mixture of inert gases such as neon, argon and xenon and having electrodes 37 and 39. A glow lamp which may be used is that manufactured by Neolamp, Inc. of Davis, Oklahoma, Part No. 1640. In general, the energy of the photons emitted from electromagnetic radiation source 36 must be sufficient to release photoelectrons from the metal of the cathode 12. Moreover, lamp 36 should preferably be so positioned that the light emitted therefrom will directly strike the internal surface of at least cathode 12.

Various means may be employed to operate the small glow lamp UV source 36. In the embodiment of FIG. 1, the existing cathode lead 16 is utilized to supply glow lamp 36 where the glow lamp is connected between cathode 12 and ground. Alternatively, the anode feedthrough may supply power to lamp 36 for initiating the discharge. Thus, regardless of whether the cathode or anode feedthrough is used to supply power to lamp 36, they would, of course, also serve their normal purpose during gauge operation.

In operation, with the high voltage anode supply 30 connected to anode 14 through resistor 32, the cathode lead 16 is removed from electrometer 18 by moving switch 20 to its dotted line position shown in FIG. 1. Switch 20 is momentarily held in its dotted line position to provide a pulse to glow lamp 36 from voltage source 22, this pulse being sufficient to start the CCG discharge. In particular, a momentary connection of a 0.1 microfarad capacitor 28 charged to 250 volts will start gauge 10.

With the gauge discharge started, the cathode lead 16 is returned to electrometer 18 so that it can read the discharge current and provide the requisite pressure measurement of the system. Since the time interval when the switch is moving from voltage source 22 with capacitor 28 to electrometer 18 is relatively short, and since the capacitance of the cathode circuit including the cathode to ground capacitance and the capacitance of lead 16 to ground is sufficient to prevent the cathode voltage from rising appreciably toward the anode voltage, the discharge is not extinguished during switching. Typically, for a cathode circuit capacitance of $10^{-10}$ farad and a pressure of $10^{-8}$ Torr, with equivalent gauge resistance of $4\times10^{11}$ ohm, the time constant would be 40 seconds. A switching time of 1 second or less would have no effect on the discharge in all situations.

Although the foregoing switching time should prevent the discharge from being extinguished and in most instances this process should effect initiation of the discharge, there may be instances when the discharge is not initiated. In these instances, it can be simply determined from the electrometer reading whether the discharge has been initiated. That is, if the electrometer reading exceeds a predetermined threshold current value associated with a discharge at the lowest rated pressure of the gauge, it can be assumed a discharge is present. If it has not, the switch can again be switched to its dotted line position to repeat the above procedure until the discharge is initiated. Determination of whether the electrometer current exceeds the above predetermined value and concomitant switching of the cathode to the capacitor 28 can be implemented either manually or automatically. That is, if the operator determines from the electrometer reading that a discharge has not been initiated, he can manually switch the cathode to the capacitor. Alternatively, the determination as to whether the electrometer current exceeds the threshold value can be done electronically and, if necessary, the cathode can also be switched to the capacitor electronically.

When switch 20 is returned to its solid line position in FIG. 1, the lamp 36 returns to its non-operating state. The non-operating lamp in parallel with electrometer 18 during normal use of the gauge and the electrometer has no effect, since the input voltage to the electrometer is less than one volt and the resistance of lamp 36 is essentially infinite under this condition.

In other embodiments of the invention as will be described below, the lamp 36 may either be turned off after the discharge is initiated or left on continuously. Thus, referring to FIG. 2, an inverted magnetron gauge 10 is shown in cross-section and includes conventional electrical feedthroughs 47 and 49 for cathode lead 16 and anode lead 33, respectively, and a conventional magnet 40 for providing the requisite magnetic field. Openings 42 are conventionally provided in cathode 12 to enable the gauge to communicate with the system whose pressure is to be measured.

In accordance with this embodiment of the invention, attached to the flange 44 of gauge 10 is an annular member 46 such as a double sided flange having a feedthrough 48 and disposed at the gauge port 50 between gauge 10 and the system. The feedthrough, as is known, provides an insulated pathway for the passage of electric signals into the gauge. Gasket 51 provides a seal between flange 44 and flange 46 while seal 55 is adapted to provide a seal between flange 46 and the system. The cathode/anode assembly 12, 14 is mounted on a flange 56 where flange 56 is removably attached to flange 58 via bolts 60 whereby the cathode/anode assembly may be removed for cleaning and maintenance. Although not illustrated the flange 46 may be connected to flange 44 in a manner similar to the connection of flange 56 to flange 58. Moreover, this same type of connection may be employed to connect flanges 44 and 46 to the system. Of course, any other type of known connecting means may also be employed. The double sided flange 46 can be incorporated in new gauges or retrofit to existing conventional gauges. When incorporated in new gauges, it can be integrally or removably connected to the gauge. When retrofit to existing gauges, accessory 46 may be manufactured and distributed as a separate stand alone unit adapted for connection to existing gauges.

The lamp 36 may be connected to electrical connection 48 and operated from a voltage source 52 which may be (a) 120 Vac or (b) a DC supply, including a suitable current limiting resistor in either case. The power required by lamp 36 is typically only a few tenths watts. The lamp may be actuated only when starting is desired or simply left on continuously. An advantage of continuous operation is that no decision is required that starting should be initiated. The lamp is not harmed by continuous operation at any pressure, including atmospheric.

Figure 2:
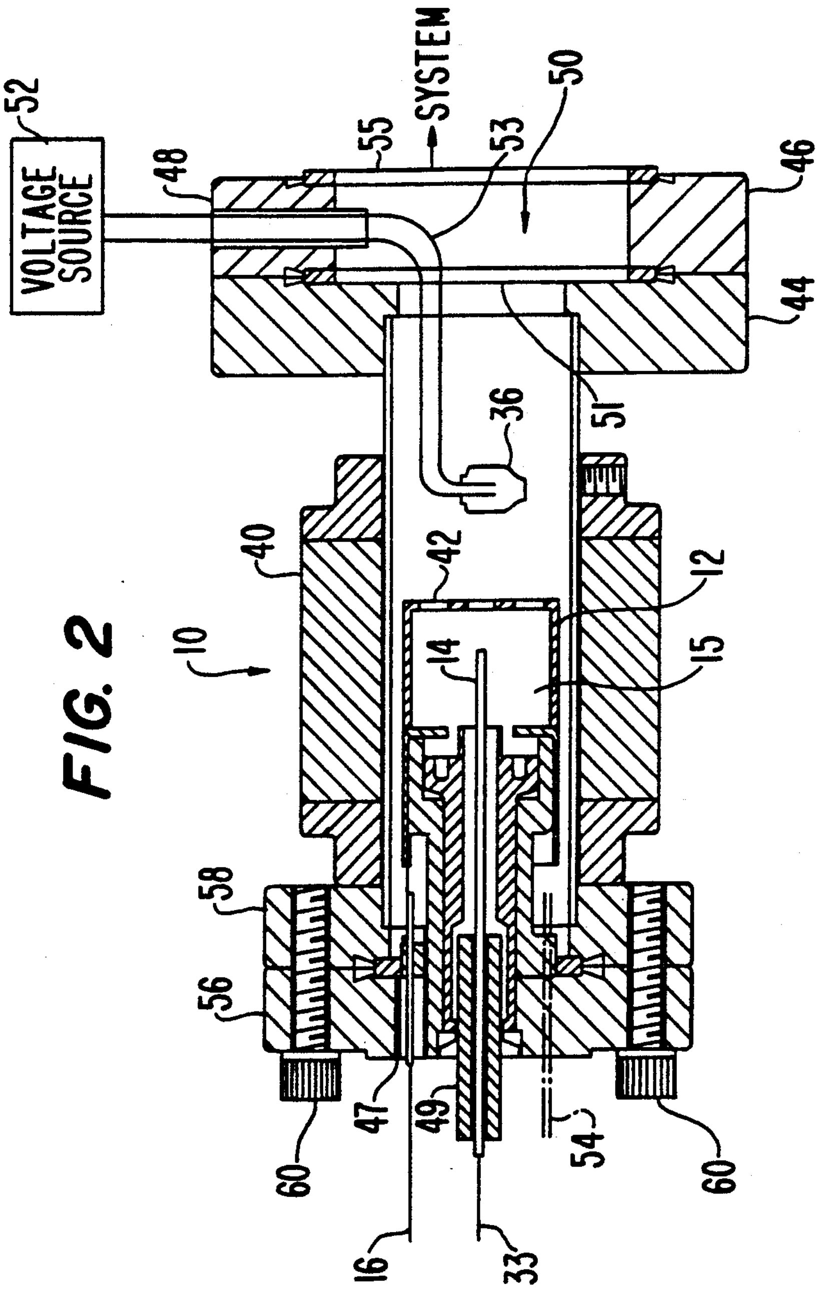
FIG. 2 is a cross-sectional diagram of a further illustrative embodiment wherein the electromagnetic radiation source is connected to a voltage source by a feedthrough in a component connected to the cold cathode gauge.

Preferably, electrical connection or wiring 53 has sufficient rigidity whereby lamp 36 may be supported within vacuum space 15 without the need for further supporting means as illustrated in FIG. 2. Of course, other support means may also be used to support the lamp as long as such support means do not block communication of the gauge with the system.

In addition to the use of a feedthrough in a member attached to the gauge, as described with respect to FIG. 2, a feedthrough, indicated by phantom lines 54 may be fixed in the vacuum envelope of gauge 10 itself to thus provide power for lamp 36. In this embodiment, the feedthrough 54 may be the same type as feedthrough 48 and connected to lamp 36 by a connection corresponding to connection 53. In either this embodiment or that of FIG. 2, the lamp may be left on continuously. Such continuous operation has no effect upon the operation or calibration of the gauge. Moreover, in either of these embodiments of FIG. 2, the circuitry connected to the gauge may correspond to that of FIG. 1 except the switch 20 and the voltage source 22 would not be required and thus cathode 12 would be fixedly connected to electrometer 18.

In the embodiments of FIGS. 1 and 2, the gauge 10 has been illustrated as an inverted magnetron gauge, which gauge is preferred; however, it is to be understood that the method of starting a cold cathode gauge in accordance with the present invention is applicable to all cold cathode geometries, including the Penning and the magnetron. Moreover, the gauges of FIGS. 1 and 2 utilize separate feedthroughs for the anode and cathode, which is a preferred embodiment of the invention. However, the invention may also be employed with cold cathode gauges which utilize a single feedthrough such as those where the current is measured in the high voltage circuit. Again, in general, the invention may be employed with all cold cathode geometries.

It will be obvious to those skilled in the art that many modifications may be made within the scope of the present invention without departing from the spirit thereof, and the invention includes all such modifications.

What is claimed is:

1. A cold cathode gauge for measuring the pressure of a vacuum within a system where the system is in direct communication with a vacuum space within the gauge, said gauge comprising:
   - an anode disposed within the vacuum space of the gauge;
   - a cathode disposed within the vacuum space of the gauge;
   - magnet means to produce a magnetic field substantially perpendicular to an electric field between the anode and cathode whereby a discharge may be established between the anode and cathode; and
   - means for initiating the discharge, said discharge initiating means being disposed within the vacuum space and emitting electromagnetic radiation directly at least at the cathode where the energy of the electromagnetic radiation is sufficient to release photoelectrons from the cathode to thus initiate the electrical discharge.

2. A gauge as in claim 1 where the gauge is an inverted magnetron cold cathode ionization gauge.

3. A gauge as in claim 1 where the gauge is a Penning gauge.

4. A gauge as in claim 1 where the gauge is a magnetron gauge.

5. A gauge as in claim 1 where said discharge initiating means comprises a glow lamp.

6. A gauge as in claim 5 where said glow lamp is filled with a mixture which includes at least one inert gas.

7. A gauge as in claim 6 where said inert gases are at least neon, argon, and xenon.

8. A gauge as in claim 1 where said discharge initiating means emits at least ultraviolet light.

9. A gauge as in claim 1 where said discharge initiating means emits at least blue light.

10. A gauge as in claim 1 where said discharge initiating means is electrically connected between (a) said anode or cathode and (b) a reference potential.

11. A gauge as in claim 10 where said reference potential is ground.

12. A gauge as in claim 10 where said discharge initiating means is connected between the cathode and ground.

13. A gauge as in claim 12 where said discharge initiating means is a glow lamp.

14. A gauge as in claim 12 including means for applying a constant voltage to said anode and means connected to said cathode for applying a pulse voltage to the discharge initiating means to thus effect said initiation of the discharge.

15. A gauge as in claim 14 where said pulse voltage source includes a capacitor and means for charging the capacitor to a predetermined value and switching means for momentarily connecting the capacitor to the discharge initiating means via the cathode to generate said pulse voltage.

16. A gauge as in claim 15 including electrometer means for measuring the current associated with said discharge to thus provide a measurement of the pressure in the system, said electrometer being normally connected to said cathode via said switching means.

17. A gauge as in claim 16 where said switching means is switched to the electrometer after the discharge is initiated.

18. A gauge as in claim 1 where said gauge includes a port adapted for connection to the system whose pressure is to be measured and where the gauge includes a member connected to the gauge at said port, said member including an electrical feedthrough and an electrical connection from said electrical feedthrough to said gas discharge initiating means whereby a voltage source may be connected to the feedthrough to operate the gas discharge initiating means.

19. A gauge as in claim 18 where said member is annular and where the system communicates with the vacuum space of the gauge through the annular member.

20. A gauge as in claim 18 where said gas discharge initiating means is a glow lamp.

21. A gauge as in claim 18 where said voltage source is an alternating current source.

22. A gauge as in claim 18 where said voltage source is a DC source.

23. A gauge as in claim 18 where said member is removably connected to the gauge.

24. A gauge as in claim 18 where said member is integrally connected to the gauge.

25. A gauge as in claim 1 including an electrical feedthrough through the gauge itself and an electrical connection from the electrical feedthrough to the discharge initiating means whereby a voltage source may be connected to the said discharge initiating means through the feedthrough.

26. A gauge as in claim 25 where said discharge initiating means is a glow lamp.

27. A gauge as in claim 25 where said voltage source is an AC source.

28. A gauge as in claim 27 where said voltage source is a DC source.

29. A gauge as in claim 1 including means for continuously actuating said discharge initiating means.

30. A gauge as in claim 29 where said discharge initiating means is a glow lamp.

31. An accessory for use with a cold cathode gauge where the gauge measures the pressure of a vacuum within a system and where the system is in direct communication with a vacuum space within the gauge, said gauge including a port adapted for connection to the system, an anode disposed within the vacuum space of the gauge, a cathode disposed within the vacuum space of the gauge, and magnet means to produce a magnetic field substantially perpendicular to an electric field between the anode and cathode whereby a discharge may be established between the anode and cathode, said accessory comprising:

a member removably attachable to the gauge at said port; and means for initiating the discharge, said discharge initiating means being so supported by the member that, when the member is attached to the gauge, the discharge initiating means is so disposed within the vacuum space of the gauge that it emits electromagnetic radiation directly at least at the cathode where the energy of the electromagnetic radiation is sufficient to release photoelectrons from the cathode to thus initiate the electrical discharge.

32. An accessory as in claim 31 where said member includes an electrical feedthrough and an electrical connection from said electrical feedthrough to said gas discharge initiating means whereby a voltage source may be connected to the feedthrough to operate the gas discharge initiating means.

33. An accessory as in claim 31 where said member is annular and where the system communicates with the vacuum space of the gauge through the annular member.

34. An accessory as in claim 31 where said gas discharge initiating means is a glow lamp.

35. An accessory as in claim 31 where said voltage source is an alternating current source.

36. An accessory as in claim 31 where said voltage source is a DC source.

* * * * *